(12) United States Patent
Cheng et al.

(10) Patent No.: US 11,141,961 B2
(45) Date of Patent: Oct. 12, 2021

(54) SHRINK FILMS COMPRISING A CYCLIC-OLEFIN COPOLYMER CORE

(71) Applicant: ExxonMobil Chemical Patents Inc., Baytown, TX (US)

(72) Inventors: Lan Y. Cheng, Shanghai (CN); Achiel J. M. Van Loon, Antwerp (BE); Yong Yang, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/965,508

(22) Filed: Apr. 27, 2018

(65) Prior Publication Data

US 2018/0333938 A1    Nov. 22, 2018

Related U.S. Application Data

(60) Provisional application No. 62/508,859, filed on May 19, 2017.

(51) Int. Cl.
*B32B 27/08* (2006.01)
*B32B 27/32* (2006.01)
*C08L 23/06* (2006.01)

(52) U.S. Cl.
CPC .............. *B32B 27/08* (2013.01); *B32B 27/32* (2013.01); *B32B 27/325* (2013.01); *C08L 23/06* (2013.01);
(Continued)

(58) Field of Classification Search
CPC ........ B32B 27/32; B32B 27/08; B32B 27/325; B32B 2250/242; B32B 2307/558;
(Continued)

(56) References Cited

U.S. PATENT DOCUMENTS 4,399,180 A * 8/1983 Briggs .................... B32B 27/32
428/212
5,635,573 A    6/1997 Harrington et al.
(Continued)

FOREIGN PATENT DOCUMENTS

GB     2397065        7/2004
JP     H08-267679 A   10/1996
(Continued)

OTHER PUBLICATIONS

In Re Application of: Achiel J. Van Loon et al., U.S. Appl. No. 15/965,508, filed Apr. 27, 2018, Examiner Awaited, Confirmation No. 1415.
(Continued)

*Primary Examiner* — Samir Shah
(74) *Attorney, Agent, or Firm* — ExxonMobil Chemical Patents Inc.—Law Technology (57) ABSTRACT

A multi-layered polyethylene film suitable for shrink applications including at least a core layer and at least one other layer adjacent thereto, the core layer including within a range from 5 wt % to 50 wt % of a cyclic olefin copolymer based on the weight of the core layer, and within a range from 50 wt % to 95 wt % of a polyethylene based on the weight of the core layer, wherein the cyclic olefin copolymer has a glass transition temperature ($T_g$) of at least 70° C.

32 Claims, 2 Drawing Sheets

(52) U.S. Cl.
CPC ....... *B32B 2250/03* (2013.01); *B32B 2250/05* (2013.01); *B32B 2250/242* (2013.01); *B32B 2250/40* (2013.01); *B32B 2270/00* (2013.01); *B32B 2307/40* (2013.01); *B32B 2307/406* (2013.01); *B32B 2307/54* (2013.01); *B32B 2307/546* (2013.01); *B32B 2307/558* (2013.01); *B32B 2307/72* (2013.01); *B32B 2307/732* (2013.01); *B32B 2307/736* (2013.01); *B32B 2323/043* (2013.01); *B32B 2323/046* (2013.01); *B32B 2553/00* (2013.01); *C08L 2203/16* (2013.01); *C08L 2205/025* (2013.01); *C08L 2207/062* (2013.01)

(58) Field of Classification Search
CPC .......... B32B 2307/72; B32B 2323/043; B32B 2553/00; B32B 2307/736; B32B 2307/732; B32B 2250/40; B32B 2250/03; B32B 2307/54; B32B 2307/406; B32B 2307/40; B32B 2323/046; B32B 2250/05; B32B 2307/546; B32B 2270/00; C08L 23/06; C08L 2205/025; C08L 2203/16; C08L 2207/062

See application file for complete search history.

(56) References Cited

U.S. PATENT DOCUMENTS

| | | | |
|---|---|---|---|
| 6,870,010 | B1 | 3/2005 | Lue et al. |
| 6,872,462 | B2 | 3/2005 | Roberts et al. |
| 7,052,750 | B2 | 5/2006 | Niepelt |
| 7,179,521 | B2 | 2/2007 | Arthurs et al. |
| 7,727,620 | B2 | 6/2010 | Yamada et al. |
| 8,092,920 | B2 | 1/2012 | Saavedra et al. |
| 8,663,810 | B2 | 3/2014 | Ambroise et al. |
| 2004/0142195 | A1 | 7/2004 | Roberts et al. |
| 2004/0234800 | A1 | 11/2004 | Arthurs et al. |
| 2005/0214557 | A1 | 9/2005 | Arthurs et al. |
| 2006/0057410 | A1 | 3/2006 | Saavedra et al. |
| 2006/0159878 | A1 | 7/2006 | Wakai et al. |
| 2007/0098933 | A1 | 5/2007 | Opuszko et al. |
| 2007/0110853 | A1 | 5/2007 | Bekele |
| 2007/0212539 | A1 | 9/2007 | Yamada et al. |
| 2008/0292225 | A1 | 11/2008 | Dayrit et al. |
| 2008/0292821 | A1 | 11/2008 | Dayrit et al. |
| 2009/0068486 | A1 | 3/2009 | Blackwell et al. |
| 2009/0286024 | A1* | 11/2009 | Lu .................. C08L 23/0815 428/34.9 |
| 2011/0212338 | A1 | 9/2011 | Ambroise |
| 2011/0256373 | A1 | 10/2011 | Tatarka et al. |
| 2011/0268979 | A1* | 11/2011 | Ambroise ............. C08L 23/06 428/516 |
| 2013/0095338 | A1 | 4/2013 | Lu |
| 2014/0134430 | A1 | 5/2014 | Mitchell et al. |
| 2014/0353197 | A1 | 12/2014 | Hu et al. |
| 2015/0010740 | A1 | 1/2015 | Chen et al. |
| 2015/0010741 | A1 | 1/2015 | Pham et al. |
| 2015/0273803 | A1 | 10/2015 | Maruichi et al. |
| 2016/0136884 | A1 | 5/2016 | Kneale |
| 2016/0368251 | A1 | 12/2016 | Banno et al. |
| 2017/0233516 | A1 | 8/2017 | Yang et al. |
| 2017/0283116 | A1* | 10/2017 | Mitchell ................. B32B 27/08 |

FOREIGN PATENT DOCUMENTS

| | | | |
|---|---|---|---|
| JP | 2002-019035 | A | 1/2002 |
| JP | 2004-025458 | A | 1/2004 |
| JP | 2005-199514 | | 7/2005 |
| JP | 2005-254458 | | 9/2005 |
| JP | 2011-104816 | | 6/2011 |
| JP | 5462697 | | 4/2014 |
| JP | 2016-035041 | A | 3/2015 |
| JP | 2015-193104 | A | 11/2015 |
| JP | 2015-199797 | | 11/2015 |
| WO | 2004-063273 | A1 | 7/2004 |
| WO | 2004/098882 | | 11/2004 |
| WO | 2014/141820 | A | 9/2014 |
| WO | 2015/004310 | | 1/2015 |
| WO | 2015/004311 | | 1/2015 |
| WO | 2015/004312 | | 1/2015 |
| WO | 2015/004313 | | 1/2015 |
| WO | WO2016102742 | * | 6/2016 |

OTHER PUBLICATIONS

TOPAS Advanced Polymers' product brochure, "Packaging Brochure (English)", https://topas.com/tech-center/brochures, (accessed Feb. 27, 2018).

Dyer et al., "Sequential shrink photolithography for plastic microlens arrays," Applied Physics Letters, 2011, vol. 99, No. 3, pp. 034102/1-034102/3.

Randy Jester, "Heat Seal Characteristics of Cyclic-olefin Copolymer/Polyethylene Blends," TOPAS 2002 Place Conference, Boston, Massachusetts (2002).

Paul D. Tatarka, "Polyolefin Film Enhancement Using Cyclic-olefin Copolymers for Retort Applications," SPE Polyolefin & Flexpack Conference, Feb. 25, 2008.

Paul D. Tatarka, "Thermoforming Enhancement With Cyclic-olefin Copolymers," SPE International Polyolefins Conference, Houston, Texas (Feb. 22, 2009).

Norman Aubee & Timothy Kneale, "Blending of Cyclic Olefins in Single Site LLDPE (sLLDPE) for Improved Bubble Stability and Output Rates on Blow Film Extrusion Process," in SPE International Polyolefins Conference, Houston, Texas (Feb. 22, 2009).

Randy Jester, "COC Enhanced Polyolefin Films for Shrink Sleeves and Labels," in AWA International Sleeve & Label Conference, Chicago, Illinois (2010).

Constant, "Cyclic Olefinic Copolymers as Non-Migrating Polymeric Slip Additives in LDPE Cast Films," in ANTEC 2002 Conference, San Francisco, California (2002).

Jester, "High Aroma Barrier Combined with Low Extractables," in 2005 Place Conference, Las Vegas, Nevada (Sep. 27, 2005).

Tatarka, "Improved properties and cost efficiencies of cyclic olefin copolymer enhanced forming films", Annual Technical Conference—Society of Plastics Engineers, 65th, pp. 1149-1153, 2007.

Jester, Randy (2007) "Cyclic-Olefin Copolymer—A High Performance Modifier for Conventional Polyolefins," *SPA Polyolefins Conf.*, 4 pgs.

* cited by examiner

SHRINK FILMS COMPRISING A CYCLIC-OLEFIN COPOLYMER CORE

PRIORITY CLAIM

This application claims priority to and the benefit of U.S. Ser. No. 62/508,859, filed May 19, 2017 and is incorporated by reference in its entirety.

FIELD OF THE INVENTION

The present disclosure relates to multi-layered films, especially shrink films, having at least a core layer that includes a cyclic-olefin copolymer.

BACKGROUND OF THE INVENTION

Primary characteristics that are required for shrink films are good shrinkage in both machine (MD) and transverse (TD) directions, and excellent strength after shrinkage, often referred to as "load retention resistance." Optical properties such as low haze and high gloss that result in a brilliant print appearance are also important. Shrink films produced from blown film processing often possess sufficient MD shrink because it is easy to stretch and orient films in the machine direction. Sufficient TD shrink is important for many aspects but is difficult to achieve. Low density polyethylene (LDPE) currently dominates the shrink films market segment with its good shrink behavior, especially in TD.

LDPE is the polymer of choice in shrink applications, both in collation shrink as pallet packaging. Due to its long chain branching, the polymer can be easily oriented during the blown film process resulting in the desired shrink properties. MD shrink is typically acceptable, as the majority of the orientation of the blown film occurs in the machine direction. The TD orientation is often obtained by selecting a large blow ratio of the film. However, this is not always possible or causes a too high amount of waste.

Certain multimodal polyethylene formulations may exhibit significant benefits over LDPE when blended with other polyethylenes such as linear low density polyethylene (LLDPE) and high density polyethylene (HDPE). The multimodal polyethylene formulations offer a higher performance on most key attributes for shrink films, but often times TD shrink is compromised. There is an industry-wide need to find components or formulations that improve TD shrink with maintained mechanical and optical properties, and more preferably with enhancement in one or more properties, which can enable polyethylene growth through opportunities such as down gauging.

Publications of interest include U.S. Pat. Nos. 7,727,620; 7,179,521; 6,872,462; U.S. Patent Publication Nos. 2015/0010741; 2014/0353197; 2011/0256373; 2007/00098933; 2006/0159878; and PCT Publication No. WO 2014/141820. Other publications of interest include:

Randy Jester, "Heat Seal Characteristics of Cyclic Olefin Copolymer/Polyethylene Blends," in TAPPI 2002 PLACE CONFERENCE, Boston, Mass. (2002);

David R. Constant, "Cyclic Olefinic Copolymers as Non-Migrating Polymeric Slip Additives in LDPE Cast Films," in ANTEC 2002 CONFERENCE, San Francisco, Calif. (2002);

Ronald R. Lamonte, "Stiffer, Thinner, Packaging Films with Improved Sealing Using Cyclic Olefin Copolymers," in FLEXPAC CONFERENCE, Amsterdam, Holland (November 2003);

Randy Jester, "High Aroma Barrier Combined with Low Extractables," in 2005 PLACE CONFERENCE, Las Vegas, Nev. (Sep. 27, 2005);

Randy Jester, "Cyclic-Olefin Copolymer—A High Performance Modifier for Conventional Polyolefins," in SPA POLYOLEFINS CONFERENCE, Houston, Tex. (Feb. 25, 2007);

Paul D. Tatarka, "Improved Properties and Cost Efficiencies of Cyclic Olefin Copolymer Enhanced Forming Films," SPE ANNUAL TECHNICAL CONFERENCE (May 7, 2007);

Paul D. Tatarka, "Polyolefin Film Enhancement Using Cyclic Olefin Copolymers for Retort Applications," in SPE POLYOLEFIN & FLEXPACK CONFERENCE, Feb. 25 (2008);

Paul D. Tatarka, "Thermoforming Enhancement With Cyclic Olefin Copolymers," in SPE INTERNATIONAL POLYOLEFINS CONFERENCE, Houston, Tex. (Feb. 22, 2009);

Norman Aubee & Timothy Kneale, "Blending of Cyclic Olefins in Single Site LLDPE (sLLDPE) for Improved Bubble Stability and Output Rates on Blow Film Extrusion Process," in SPE INTERNATIONAL POLYOLEFINS CONFERENCE, Houston, Tex. (Feb. 22, 2009); and Randy Jester, "COC Enhanced Polyolefin Films for Shrink Sleeves and Labels," in AWA INTERNATIONAL SLEEVE & LABEL CONFERENCE, Chicago, Ill. (2010).

SUMMARY OF THE INVENTION

Disclosed is a multi-layered polyethylene film suitable, for example, for shrink wrap applications, comprising (or consisting essentially of or consisting of) at least a core layer and at least one other layer adjacent thereto, the core layer comprising within a range from 5 wt % to 20, or 30, or 40, or 50 wt % of a cyclic olefin copolymer based on the weight of the core layer, and within a range from 50 wt % to 95 wt % (the remainder of material) of a polyethylene based on the weight of the core layer, wherein the cyclic olefin copolymer has a glass transition temperature ($T_g$) of at least 70, or 80, or 90° C. (or within a range from 70, or 80, or 90° C. to 140, or 150, or 160° C.). The multi-layered films can be formed by any suitable means such as casting or blowing technologies.

DETAILED DESCRIPTION

Figure 1:
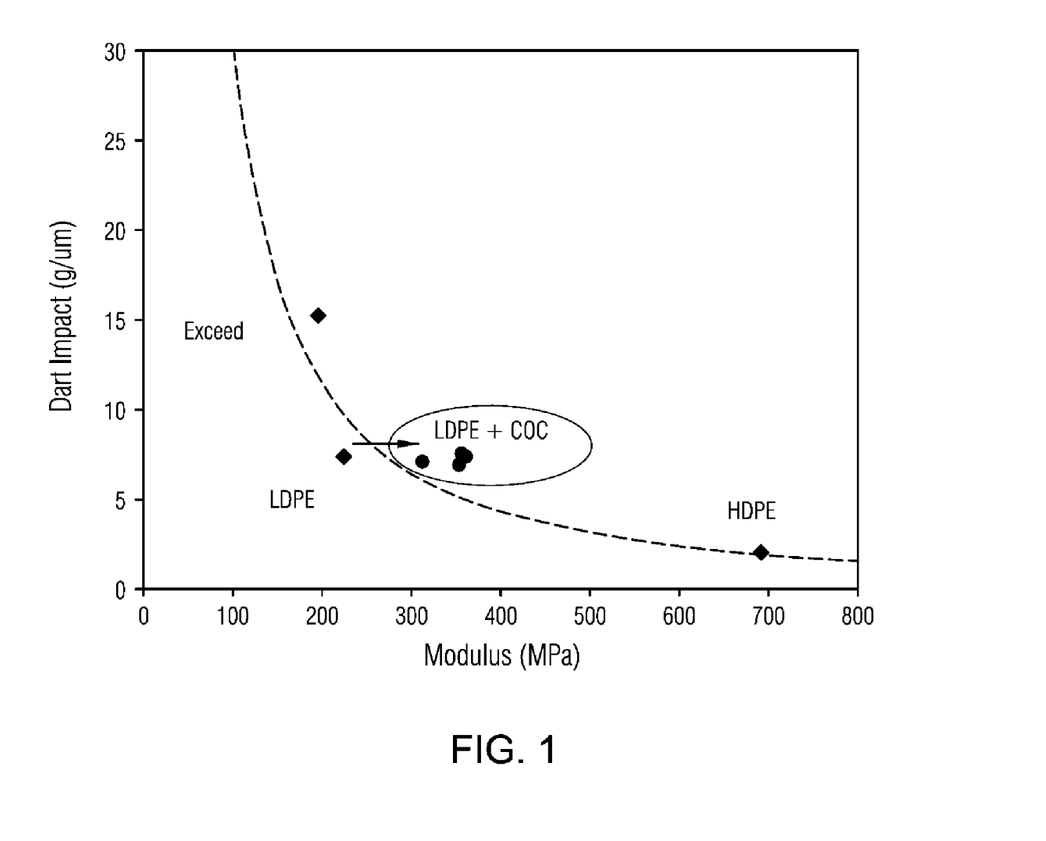
FIG. 1 is a plot of dart impact as a function of modulus for the inventive blends and competitive compositions.
Figure 2:
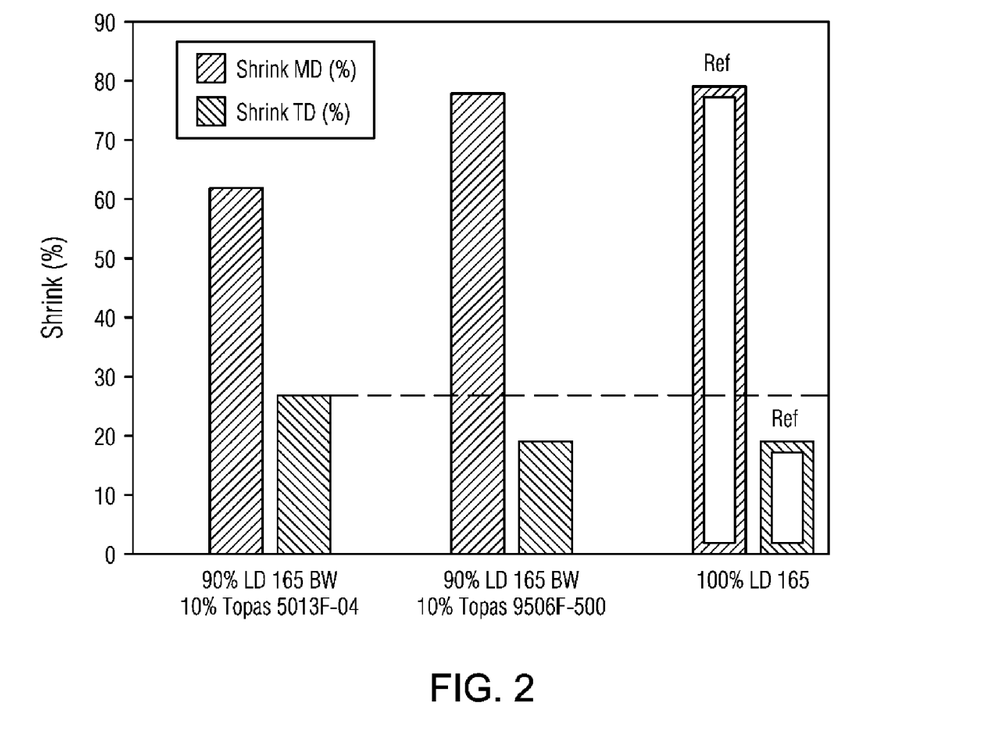
FIG. 2 is a bar graph of shrink % for inventive and competitive films.

The current disclosure solves the problem of sufficient TD strength by using a new film structure comprising cyclic-olefin copolymer (COC). The blown films produced from low to medium levels (typically 6%) of COC in overall PE components exhibit the a combination of properties which have not been possible in the prior art, including significantly enhanced TD shrink with maintained sufficient MD shrink; significantly enhanced stiffness, which will result in better load retention resistance; better toughness and stiffness balance; maintained excellent optical properties; and easily processable under drop-in processing conditions with the potential of higher output rates. These improvements can also enable significant down gauging opportunities with required performance on shrinkage, stiffness/toughness balance, holding force, and sealing.

As used herein, a "cyclic-olefin copolymer" (COC) is a copolymer comprising 50 wt % or more ethylene derived units, the remainder being cyclic olefin derived units selected from C5 to C8, or C12, or C16, or C20 olefins comprising at least one C5 to C8 cyclic structure, such as, for example, bicyclo compounds such as bicyclo-(2,3,1)-heptene-2. Preferably, the cyclic olefin derived unit is selected from C5, or C6 to C8, or C10, or C12, or C20 cyclic-olefin derived units, and more preferably bicyclic olefin derived units which are cyclic olefins containing a bridging hydrocarbon moiety that forms two rings in the overall structure such as in bicyclo-(2,3,1)-heptene-2 (norbornenes). Most preferably, the cyclic olefin derived units are selected from norbornenes, tetracyclododecene, and substituted versions thereof.

In any embodiment, the cyclic olefin content (cyclic olefin derived units) of the COC's useful herein is 60, or 65, or 70 wt % or more, or within a range from 40, or 45, or 50, or 55, or 60, or 65, or 70 wt % to 80, or 85, or 90 wt %, by weight of the COC.

The cyclic-olefin copolymers can be made by any suitable polymerization means. In any embodiment, the cyclic olefin monomer that is combined with ethylene monomers in the polymerization process is selected from C5 to C8, or C12, or C16, or C20 olefins comprising at least one C5 to C8 cyclic structure, such as, for example, bicyclo compounds such as bicyclo-(2,3,1)-heptene-2. Preferably, the cyclic olefin is selected from C5, or C6 to C8, or C10, or C12, or C20 cyclic olefins, and more preferably bicyclic olefins which are cyclic olefins containing a bridging hydrocarbon moiety that forms two rings in the overall structure such as in bicyclo-(2,3,1)-heptene-2 (norbornenes). Most preferably, the cyclic olefins used to make the COC's are selected from norbornenes, tetracyclododecene, and substituted versions thereof. In order to effect the polymerization process upon combining, as well as combining at a desirable temperature, the components are preferably combined at a pressure of at least 0.8, or 1, or 2, or 3 MPa; or within a range from 0.8, or 1, or 2, or 3 MPa to 4, or 6, or 8, or 10 MPa. This pressure can come from the addition of the ethylene and/or other gases in the polymerization reactor, and is of course influenced by the temperature of the reactor. The level of ethylene and cyclic olefin is adjusted to obtain the desired catalytic activity as well as desired level of cyclic olefin comonomer incorporation into the polyethylenes described herein. In any embodiment, the combining of the monomers with catalyst can take place at a reaction temperature, the average temperature within the vessel or reactor used to combine the components to effect polymerization, within a range from 80, or 85, or 90, or 100° C. to 120, or 130, or 140, or 150° C.

As used herein a "film" or "multi-layered film" is a material that has an average thickness of less than or equal to 0.25 mm and may include one or more substances such as polymers, fillers, additives, oils, etc., and preferably is continuous within its measurable width and length, typically is flexible, and preferably has a thickness within a range from 2, or 10, or 20, or 40, or 45 μm to 50, or 100, or 150, or 200, or 250 μm. Most preferably, the multi-layered films described herein have a thickness within a range from 30, or 40, or 45 μm to 50, or 55, or 60, or 100 μm. The term "film" also includes coatings, such as when the film is extruded onto a surface such as a metal, glass, another polymer, or other stiff or flexible surface. In any embodiment the multi-layered films described herein are so called shrink films.

Desirably, the inventive multi-layered films may be at least 5, or 10, or 20% thinner than the same film without the COC, as described herein.

As used herein, the term "polyethylene" alone refers to polymers of ethylene-derived units and optional C3 to C12 α-olefin derived units, excluding cyclic olefin monomer units. Examples include LLDPE, LDPE, HDPE, and/or medium density polyethylenes.

It is contemplated that other materials can be incorporated into a film layer, or that a film layer itself may comprise or consist essentially of another material in any embodiment herein. Suitable materials include ethylene vinyl acetate, ethylene-based ionomers, polypropylene, propylene-based elastomers, ethylene-based plastomers, ethylene-propylene rubbers, styrenic block copolymers, styrenic polymers, cellulosic polymers, and combinations thereof.

Thus, in any embodiment is a multi-layered polyethylene film comprising at least a core layer and at least one other layer adjacent thereto, the core layer comprising within a range from 5 wt % to 15, or 20, or 30, or 40, or 50 wt % of a cyclic olefin copolymer based on the weight of the core layer, the remainder of the core being polyethylene, preferably LDPE and/or LLDPE, based on the weight of the core layer, wherein the cyclic olefin copolymer has a glass transition temperature ($T_g$) of at least 70, or 80, or 90° C., or within a range from 70, or 80, or 90° C. to 140, or 150, or 160° C.

Values of $T_g$ and the melting point temperature ($T_m$) referred to herein can be determined using Differential Scanning calorimeter (DSC) methods. In particular, approximately 6 mg of material is placed in a microliter aluminum sample pan. An example of a suitable differential scanning calorimeter is a Perkin Elmer or TA Instrument Thermal Analysis System. The sample is then heated from 23° C. to 220° C. at 10° C./minute and held at 220° C. for 5 minutes. Afterward, the sample is cooled down to −20° C. at 10° C./minute. The sample is held at −20° C. for 5 minutes and then heated from −20° C. to 220° C. at 10° C./minute for a second heating cycle. The $T_m$ and $T_g$ is determined on the second heating cycle. The $T_m$ is the peak heat flow (zero inflection). For $T_g$, the "Glass Transition" menu item on the TA Universal Analysis equipment can be used to calculate the onset, end, inflection, and signal change of $T_g$ in the DSC. The program enables the determination of the onset, which is the intersection of the first and second tangents, where the inflection is the portion of the curve between the first and third tangents with the steepest slope, and the end is the intersection of the second and third tangents.

In any embodiment, the cyclic olefin copolymer has an I2 (2.16 kg/190° C.) within a range from 0.01, or 0.1 g/10 min to 1, or 1.5, or 2 g/10 min.

Preferably, the core layer is sandwiched between two polyethylene skin layers. In a preferred embodiment, the at least one core layer is sandwiched between two to six layers comprising LLDPE. Preferred configurations include a skin/core/skin, and skin/sub-skin/core/sub-skin/core configurations. In any embodiment, each skin layer independently comprises at least 50 wt % linear low density polyethylene by weight of each skin layer. In any embodiment, the multi-layered film further comprises a sub-skin layer sandwiched between a core layer(s) and each skin layer. Preferably, each sub-skin layer independently comprises at least 50 wt % linear low density polyethylene by weight of each skin layer. In the embodiments where there are two or more core layers, they are preferably adjacent to one another, but may have a layer of polyethylene such as LDPE or LLDPE there between.

In any embodiment, each polyethylene skin layer independently has a density within a range from 0.88, or 0.9, or 0.91 g/cm$^3$ to 0.925 g/cm$^3$.

Density can be determined according to ASTM D 1505-10. Compression molded samples for density measurements are made according to ASTM D4703-10a. Samples are conditioned by 40 hours conditioning of the density molded specimens (typically made from pellet samples) at 23° C. before density measurement.

In any embodiment, the polyethylene of the core layer is a linear low density polyethylene, a low density polyethylene, or a combination thereof. Preferably, the linear low density polyethylene is a copolymer comprising within a range from 0.5 to 10, or 20 wt % C4 to C12 α-olefin derived units by weight of the copolymer, the remainder of the copolymer comprising ethylene-derived units. Also, the linear low density polyethylene preferably has a peak melting point temperature ($T_m$) within a range from 90° C. to 130° C. Finally, the linear low density polyethylene preferably has an $I_2$ (2.16 kg/190° C.) within a range from 0.2 g/10 min to 3, or 4, or 5 g/10 min.

In any embodiment, the core layer further comprises within a range from 0.5 wt % to 20 wt % LDPE. Also, in any embodiment, each skin layer further independently comprises within a range from 0.5 wt % to 20 wt % LDPE.

The multi-layered films described herein have a number of unique properties. In any embodiment, the multi-layered films have a TD shrink of at least 18, or 20%, or within a range from 18, or 20% to 28, or 30, or 36%. In any embodiment, the multi-layered films have a TD shrinking force within a range from 10 to 20 mN. In any embodiment, the multi-layered films have an MD shrink within a range from 55 to 90%. In any embodiment, the multi-layered films have an MD shrinking force within a range from 60 to 80 mN. In any embodiment, the multi-layered films have a 1% TD secant flexural modulus of at least 280 MPa, or within a range from 280, 300 MPa to 360, or 400, or 460 MPa. In any embodiment, the multi-layered films have a 1% MD secant flexural modulus of at least 280 MPa, or within a range from 280, 300 MPa to 360, or 400, or 460 MPa. In any embodiment, the multi-layered films have a plateau seal strength of at least 14, or 15 N, or within a range from 14, or 15 N to 20, or 22 or 24 N.

Also, in any embodiment, the multi-layered films have an MD or TD tensile strength of at least 20, or 25, or 30, or 35 MPa, or within a range from 20, or 25, or 30, or 35 MPa to 50, or 55, or 60, or 65 MPa.

Also, in any embodiment, the multi-layered films have a dart drop of at least 6, or 7, or 10, or 16 g/μm, or within a range from 6, or 7, or 10, or 16 g/μm to 20, or 26, or 30, or 36, or 40 μm.

In any embodiment, the multi-layered films have a gloss of at least 70, or 75, or 80, or 85%. In any embodiment, the multi-layered films have a haze value of less than 20, or 15, or 10%.

In any embodiment, the multi-layered films have a dart drop within a range from 2, or 4 g/μm to 10, or 12, or 16, or 18, or 20 g/μm.

A preferred process to form the multi-layered films is in a blown film process. In a typical blown film process, a polyethylene melt is extruded through a die such as an annular slit die, usually vertically, to form a thin walled tube. Preferably, the die used in the formation of the films herein is designed such that the die opening, through which the molten polyethylene emanates, is in the form of a ring and the molten polyethylene emanating therefrom is in the form of a continuous tube. Cooling, preferably in the form of air, is introduced via a ring in the center of the die to blow up the tube like a balloon. Cooling could also be effectuated by other means, and the air may be nitrogen/oxygen or other gases or mixtures of gases or liquids. Mounted on top of the die, a high-speed air ring blows onto the hot film to cool it. The tube of film can then continue upwards away from the die, continually cooling, until it may pass through nip rolls where the tube is flattened to create what is known as a "lay-flat" tube of film. This lay-flat or collapsed tube can then be taken back down the extrusion "tower" via more rollers. In any embodiment, the air inside the bubble is also exchanged, known as "Internal Bubble Cooling" (IBC).

In any case, the lay-flat film is then either kept as such or the edges of the lay-flat are slit off to produce two flat film sheets and wound up onto reels. Articles, such as bags, can be made from such lay-flat films. In this regard, if kept as lay-flat, the tube of film is made into bags by sealing across the width of film and cutting or perforating to make each bag. This is done either in line with the blown film process or at a later stage.

Preferably, the expansion ratio between die and blown tube of film would be 1.1, or 1.2 to 2, or 3, or 4 times the die diameter. The drawdown between the melt wall thickness and the cooled film thickness occurs in both radial and longitudinal directions and is easily controlled by changing the volume of air inside the bubble and by altering the haul off speed. This gives blown film a better balance of properties than traditional cast or extruded film which is drawn down along the extrusion direction only.

A typical blown film process can be used where the ingredients used to form the film are added in any desirable form, preferably as granules to a hopper, which feeds the material to the extruder, where the materials are melt blended at a desirable temperature through shear forces and/or heating. Common "additives," such as antioxidants, may be added either as a solid to the hopper, or in the form of a masterbatch, wherein the one or more additives is incorporated into a polymeric or waxy pellet. The molten material is then fed, with or without filtering, to a die which is also heated to a desired temperature and then forced from the die. The cooling of the forming film takes place preferably via a device that blows air that is at least 10 or 20° C. cooler than the surrounding air. The air preferably blows against the outside of the film, most preferably around the entire circumference formed by the film. There is also air blown internally that both cools and blows the film up like a balloon. The film starts to expand where it eventually cools and crystallizes to form finished film. The air blowing device can be adjusted up or down, away from the die, to allow the molten, heated tube of polymer to crystalize on its own (under room temperature such as 20° C.) before being cooled further.

The multi-layered films have certain processing advantages. In any embodiment, the at least one core layer of the multi-layered films extrudes at a melt temperature at the die (measured using a thermocouple in the melt) of 238, or 240° C. or less, or within a range from 210, or 215, or 220, or 225, or 230° C. to 238, or 240, or 245, or 250° C. In any embodiment, the at least one core layer of the multi-layered films extrudes at a melt pressure of 45, or 42 MPa or less, or within a range from 30, or 35, or 38 MPa to 42, or 45, or 50 MPa. These melt temperatures and melt pressures are preferably obtained with a die factor within a range from 0.6 to 1 kg/mm die 4, and/or a specific output within a range from 2.8 to 3.2 kg/h/rev. The die factor is expressed in kg/mm-hr, the full expression is kg/die diameter (in unit of mm)/hr.

The various descriptive elements and numerical ranges disclosed herein for the inventive multi-layered structures and methods of forming such can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

1. A multi-layered polyethylene film comprising at least a core layer and at least one other layer adjacent thereto, the core layer comprising within a range from 5 wt % to 50 wt % of a cyclic olefin copolymer based on the weight of the core layer, and within a range from 50 wt % to 95 wt % of a polyethylene based on the weight of the core layer, wherein the cyclic olefin copolymer has a glass transition temperature ($T_g$) of at least 70° C.

2. The multi-layered polyethylene film of paragraph 1, wherein the core layer is sandwiched between two polyethylene skin layers.

3. The multi-layered polyethylene film of paragraph 2, wherein each skin layer independently comprises at least 50 wt % linear low density polyethylene by weight of each skin layer.

4. The multi-layered polyethylene film of paragraph 2, further comprising a sub-skin layer sandwiched between the core layer and each skin layer.

5. The multi-layered polyethylene film of paragraph 4, wherein each sub-skin layer independently comprises at least 50 wt % linear low density polyethylene by weight of each skin layer.

6. The multi-layered polyethylene film of paragraph 1, wherein the cyclic olefin copolymer has an $I_2$ (2.16 kg/190° C.) within a range from 0.01 to 1 g/10 min.

7. The multi-layered polyethylene film of paragraph 1, wherein the cyclic olefin copolymer comprises 60 wt % or more cyclic olefin derived units by weight of the cyclic olefin copolymer.

8. The multi-layered polyethylene film of paragraph 3, wherein each polyethylene skin layer has a density within a range from 0.88 g/cm$^3$ to 0.925 g/cm$^3$.

9. The multi-layered polyethylene film of paragraph 1, wherein the polyethylene of the core layer is a linear low density polyethylene, a low density polyethylene, or a combination thereof.

10. The multi-layered polyethylene film of paragraph 9, wherein the linear low density polyethylene is a copolymer comprising within a range from 0.5 to 20 wt % C4 to C12 α-olefin derived units by weight of the copolymer, the remainder of the copolymer comprising ethylene-derived units.

11. The multi-layered polyethylene film of paragraph 9, wherein the linear low density polyethylene has a peak melting point temperature ($T_m$) within a range from 90° C. to 130° C.

12. The multi-layered polyethylene film of paragraph 9, wherein the linear low density polyethylene has an $I_2$ (2.16 kg/190° C.) within a range from 0.2 g/10 min to 5 g/10 min.

13. The multi-layered polyethylene film of paragraph 1, having a TD shrink of at least 18%.

14. The multi-layered polyethylene film of paragraph 1, having a TD shrinking force within a range from 10 to 20 mN.

15. The multi-layered polyethylene film of paragraph 1, having an MD shrink within a range from 55 to 90%.

16. The multi-layered polyethylene film of paragraph 1, having an MD shrinking force within a range from 60 to 80 mN.

17. The multi-layered polyethylene film of paragraph 1, having a 1% TD secant flexural modulus of at least 280 MPa.

18. The multi-layered polyethylene film of paragraph 1, having a 1% MD secant flexural modulus of at least 280 MPa.

19. The multi-layered polyethylene film of paragraph 1, having a plateau seal strength of at least 14 N.

20. The multi-layered polyethylene film of paragraph 1, the core layer further comprising within a range from 0.5 wt % to 20 wt % LDPE.

21. The multi-layered polyethylene film of paragraph 3, each skin layer further independently comprising within a range from 0.5 wt % to 20 wt % LDPE.

22. The multi-layered polyethylene film of paragraph 1, having a thickness within a range from 30 µm to 100 µm.

23. The multi-layered polyethylene film of paragraph 1, comprising at least the core layer sandwiched between two to six layers comprising LLDPE.

24. A shrink film comprising the multi-layered polyethylene film of paragraph 1.

25. A process comprising extruding the multi-layered polyethylene film of paragraph 1 at a melt temperature at the die of 238° C. or less.

26. A process comprising extruding the multi-layered polyethylene film of paragraph 1 at a melt pressure of 42 MPa or less

EXAMPLES

Materials used in the example films herein include a grade of Exceed 1018 LLDPE having different additives: 'LA' contains 4500 ppm antiblock and 450 ppm slip; 'HA' no antiblock, no slip; and 'KB' 2500 ppm antiblock and 800 ppm slip. Also used are two grades of high pressure reactor-produced low density polyethylenes (LD) from ExxonMobil: LD150 BW ($I_2$ of 0.75 g/10 min [190° C./2.16 kg], density 0.923 g/cm$^3$) and LD 165 BW (12 of 0.33 g/10 min, density 0.922 g/cm$^3$). Finally, three grades of Topas™ cyclic-olefin copolymers (COC's) are used as summarized in Table 1. All film test methods used are as follows:

| Test | Method or description |
|---|---|
| Melt index ($I_2$) | ASTM D-1238, 2.16 kg, 190° C. |
| 1% secant flexural modulus | ASTM D-882, 15 mm width strip |
| Tensile Strength at Break | ASTM D-882, 15 mm width strip |
| Elongation at Break | ASTM D-882, 15 mm width strip |
| Dart Drop | ASTM D-1709 |
| Haze | ASTM D-1003 |
| Gloss, 45° | ASTM D-2457 |
| Plateau Seal Strength | ASTM F-88 |
| Peak Hot Tack Force | ASTM F-1921 |
| Shrinking Force | ISO 14616 |
| Contracting Force | ISO 14616 |
| Shrinkage Speed | ISO 14616 |

Shrink (Betex shrink), reported as a percentage, was measured by cutting circular specimens from a film using a 50 mm die. The samples were then put on a copper foil and embedded in a layer of silicon oil. This assembly was heated by putting it on a 150° C. hot plate (model Betex) until the dimensional change ceased. An average of four specimens is reported. A negative shrinkage number indicates expansion of a dimension after heating when compared to its preheating dimension.

A first set of experiments were conducted at using a 5-layer W&H blown film line. The extruder used for the core layer had 10 sections kept at a set temperature of about 190° C. The feed zone is the starting zone of the extruder at the hopper where resins are added to the extruder, followed by 4 zones where the resins are heated, blended, and transferred. Finally, the melt will go through die to form film. The 10 die head zone is the heating areas to control the temperature of die head. The basic properties of the COC grades used are summarized in Table 1 and the film design is shown in Table 2. Since the skin layer and sub-skin layer are identical, essentially 3-layer films were produced. The film had a 2.5 bubble blow-up ratio (BUR). The overall average film thickness is 50 μm (1/4/1), with the skin layers containing 95 wt % Exceed™ 1018 KB LLDPE and 5 wt % LDPE (LD) LD 150 BW from ExxonMobil; and the core layer containing 90 wt % Exceed™ 1018 HA LLDPE and 10 wt % COC, or 100 wt % Exceed™ 1018 LLDPE. The COC level in the entire film is 6.7 wt %. Three types of COC were utilized, generating three films (numbers 1 to 3 in Table 2). Films including the COC3 are comparative examples, while films including COC1 and COC2 are inventive. A control film number 4 (film without COC) was also produced, with the same structure as films 1 to 3, but no COC in the core layer. The specific processing conditions are listed in Table 3, which are exemplary conditions used throughout this specification.

TABLE 1

COC Grades Used in the Film Production

| Grade | Density (g/cc) | Norbornene Content (wt %) | Melt Index Equivalent (g/10 min) (190° C./ 2.16 Kg) | Glass Transition Temperature* (° C.) |
|---|---|---|---|---|
| Topas™ 5013F-04 (COC1) | 1.020 | 78 | <0.1 | 134 |
| Topas™ 8007F-600 (COC2) | 1.020 | 65 | 2.0 | 78 |
| Topas™ 9506F-500 (COC3) | 1.010 | 62 | 1.0 | 65 |

*As reported by Topas Advanced Polymers, Inc. by DSC per ISO 11357-1, -2, -3, at a heating rate of 10° C./minute.

TABLE 2

Film Design for First Set of Experiments

| Number | Skin 0.5 | Sub Skin 1 | Core 6 | Sub Skin 1 | Skin 0.5 |
|---|---|---|---|---|---|
| 1 | LLDPE 95 wt % LD 5 wt % | | 90 wt % LLDPE 10 wt % COC1 | | LLDPE 95 wt % LD 5 wt % |
| 2 | LLDPE 95 wt % LD 5 wt % | | 90 wt % LLDPE 10 wt % COC2 | | LLDPE 95 wt % LD 5 wt % |
| 3 | LLDPE 95 wt % LD 5 wt % | | 90 wt % LLDPE 10 wt % COC3 | | LLDPE 95 wt % LD 5 wt % |
| 4 | LLDPE 95 wt % LD 5 wt % | | 100 wt % LLDPE | | LLDPE 95 wt % LD 5 wt % |

TABLE 3

Exemplary Blown Film Core Layer Processing Conditions

| Process Parameter | | 1 | 2 | 3 | 4 |
|---|---|---|---|---|---|
| Screw Speed | rpm | 49.5 | 48.3 | 48.9 | 49.0 |
| Amperage | % | 68.0 | 67.0 | 63.0 | 68.0 |
| Output (extruder) | kg/h | 147.1 | 151.4 | 150.4 | 148.6 |
| Layer Thickness | μm | 32.3 | 33.4 | 33.1 | 33.0 |
| RMW (extruder) | g/m | 66.1 | 68.1 | 67.6 | 66.8 |
| Specific Output | kg/h/rev | 2.97 | 3.13 | 3.08 | 3.03 |
| Melt Temperature | ° C. | 235 | 232 | 233 | 236 |
| Melt Pressure | MPa | 39.3 | 40.1 | 40.3 | 41.9 |
| Feed Zone | ° C. | 40 | 40 | 40 | 39 |
| Feed Zone 1 | ° C. | 179 | 180 | 180 | 179 |
| Feed Zones 2-4 | ° C. | 190 | 190 | 190 | 190 |
| SC Unit | ° C. | 190 | 190 | 189 | 190 |
| Adapter | ° C. | 201 | 201 | 200 | 202 |
| Die Head - Zone 1-10 | ° C. | 190 | 190 | 190 | 190 |
| Die Insert | mm | 280 | 280 | 280 | 280 |
| Die Gap | mm | 1.4 | 1.4 | 1.4 | 1.4 |
| Total Throughput | kg/h | 222 | 227 | 226 | 224 |
| Σ RMW | g/m | 100 | 102 | 102 | 101 |
| Die Factor | kg/mm die φ | 0.8 | 0.8 | 0.8 | 0.8 |
| Freeze Line Height | mm | 950 | 960 | 980 | 1000 |
| Lay Flat Width | mm | 1101.6 | 1100.0 | 1096.2 | 1096.7 |
| BUR | | 2.51 | 2.50 | 2.49 | 2.49 |
| Haul-Off Speed | m/min | 37.10 | 37.00 | 37.00 | 37.10 |
| Film Thickness | μm | 49.0 | 50.1 | 49.8 | 49.7 |
| Basket Width | mm | 1194 | 1177 | 1174 | 1177 |
| Basket Height | mm | 1457 | 1457 | 1457 | 1457 |
| External Air | % | 58.0 | 60.0 | 60.0 | 60.0 |
| External Air Temperature | ° C. | 19.0 | 20.0 | 20.0 | 20.0 |
| IBC-IN | % | 59.7 | 60.2 | 60.1 | 60.0 |
| IBC IN Temperature | ° C. | 15.0 | 15.0 | 15.0 | 15.0 |
| IBC OUT | % | 38.0 | 38.0 | 38.0 | 38.0 |
| IBC OUT Temperature | ° C. | 61.0 | 60.0 | 60.0 | 61.0 |

The films 1 to 3 with COC in the core layer can be processed at milder or similar conditions to the control film number 4. Visually, the bubble of the COC-containing films are very stable. This series of experiments didn't test the maximum output rate of film production; however, the addition of COC can improve the bubble stability and consequently maximum output rate due to its high $T_g$ and/or viscosity effects. The film properties for this first set of experiments are shown in Table 4. The LLDPE/COC blends produce low gel films with excellent optics, where film number 1 performed particularly well with high MD secant flexural modulus, hot tack, and seal strength. All films have similar gauge. All the films are conditioned 48 h after processing.

It was found for mixtures of less than 5 wt % COC in polyethylene, the blends were miscible, while blends greater than 20 wt % COC in polyethylene, the COC forms large isolated domains. COC was slightly phase separated when loaded 5 to 20 wt % in polyethylene. In these cases, COC was immiscible but compatible with polyethylene. It is believed that this imparts morphological features that reinforce the polyethylene matrix and enhance the overall mechanical properties of the inventive multi-layered films.

TABLE 4

Film Properties of First Set of Experiments

| Film property | | 1 | 2 | 3 | 4 |
|---|---|---|---|---|---|
| 1% secant flexural modulus, MD | MPa | 418 | 305 | 294 | 197 |
| 1% secant flexural modulus, TD | MPa | 277 | 257 | 254 | 200 |
| Tensile Strength at Break, MD | MPa | 53.0 | 52.3 | 54.3 | 53.5 |
| Tensile Strength at Break, TD | MPa | 59.0 | 54.7 | 57.1 | 55.2 |

TABLE 4-continued

Film Properties of First Set of Experiments

| Film property | | 1 | 2 | 3 | 4 |
|---|---|---|---|---|---|
| Elongation at Break, MD | % | 581 | 553 | 566 | 590 |
| Elongation at Break, TD | % | 640 | 619 | 617 | 643 |
| Dart Drop | g/µm | 14.3 | 20.2 | 21.3 | 15.3 |
| Haze | % | 5.7 | 7.2 | 7.3 | 9.6 |
| Gloss, 45° | % | 85.4 | 75.0 | 74.5 | 70.7 |
| Plateau Seal Strength | N | 17.5 | 17.9 | 16.7 | 13.9 |
| Peak Hot Tack Force | N | 16.1 | 13.4 | 12.6 | 12.4 |

A second set of experiments were conducted at using the same 5-layer H&W blown film line. The basic properties of COC grades are summarized in Table 1. Film design is shown in Table 5, where the LLDPE used throughout is Exceed™ 1018 KB LLDPE, and the low density (LD) polyethylene is LD 150 BW used in the skins, and LD 165 BW in the core, both from ExxonMobil. Since the skin layer and sub-skin layer are identical, essentially 3-layer films were produced. The film had a 2.5 bubble blow-up ratio (BUR). The overall average film thickness is 50 µm (1/4/1), with the skin layers containing 95 wt % Exceed 1018 and 5 wt % LDPE, and the core layer containing a major LDPE component and a minor COC component. Three types of COC were utilized in four COC-containing films (number 1 to 4 in Table 2). A control film was also produced, with the exactly same structure but no COC in the core layer (number 5 in Table 5). The processing conditions are very similar to those listed in Table 3.

TABLE 5

Film Design for Second Set of Experiments

| Number | Skin 0.5 | Sub Skin 1 | Core 6 | Sub Skin 1 | Skin 0.5 |
|---|---|---|---|---|---|
| 5 | LLDPE 95 wt % LD 5 wt % | 90 wt % LD 10 wt % COC1 | LLDPE 95 wt % LD 5 wt % | | |
| 6 | LLDPE 95 wt % LD 5 wt % | 70 wt % LD 20 wt % COC1 10 wt % LLDPE | LLDPE 95 wt % LD 5 wt % | | |
| 7 | LLDPE 95 wt % LD 5 wt % | 90 wt % LD 10 wt % COC2 | LLDPE 95 wt % LD 5 wt % | | |
| 8 | LLDPE 95 wt % LD 5 wt % | 90 wt % LD 10 wt % COC3 | LLDPE 95 wt % LD 5 wt % | | |
| 9 | LLDPE 95 wt % LD 5 wt % | 100 wt % LD 165 BW | LLDPE 95 wt % LD 5 wt % | | |

The films with COC in the core layer can be processed at similar or milder conditions as the control film. The bubbles of the inventive films are very stable and final films are of high quality. It was found that the addition of COC improved the bubble stability and consequently maximum output rate provided by its higher melt strength due to the high $T_g$ and/or viscosity. The film properties are shown in Table 6. The LDPE/COC blends produced low gel films with excellent optics.

TABLE 6

Film Properties for Second Set of Experiments

| Film property | | 5 | 6 | 7 | 8 | 9 |
|---|---|---|---|---|---|---|
| 1% secant flexural modulus, MD | MPa | 353 | 360 | 355 | 312 | 223 |
| 1% secant flexural modulus, TD | MPa | 301 | 308 | 367 | 319 | 262 |

TABLE 6-continued

Film Properties for Second Set of Experiments

| Film property | | 5 | 6 | 7 | 8 | 9 |
|---|---|---|---|---|---|---|
| Tensile Strength at Break, MD | MPa | 24.3 | 28.2 | 29.5 | 28.3 | 24.8 |
| Tensile Strength at Break, TD | MPa | 28.1 | 34.3 | 31.8 | 28.7 | 30.0 |
| Elongation at Break, MD | % | 230 | 215 | 200 | 257 | 231 |
| Elongation at Break, TD | % | 569 | 633 | 586 | 567 | 576 |
| Dart Drop | g/µm | 6.9 | 7.4 | 7.5 | 7.1 | 7.4 |
| Haze | % | 4.5 | 4.2 | 4.6 | 4.5 | 4.3 |
| Gloss, 45° | % | 82.5 | 79.9 | 78.1 | 78.6 | 80.2 |
| Shrink MD | % | 62 | 69 | 79 | 78 | 79 |
| Shrink TD | % | 27 | 14 | 16 | 19 | 19 |

As shown in Table 6, addition of low to medium levels of COC in LDPE significantly improved stiffness, with up to 58% improvement. Tensile strength and elongation at break were retained, as well as dart drop. Excellent optical properties (low haze and high gloss) were also maintained. Excellent MD shrink was maintained in the formulations with less rigid Topas™ COC grades 8007 and 9506, while is still sufficient in the formulations with rigid Topas™ COC grade 5013. Remarkably, TD shrink in the formulation with 10 wt % Topas™ 5013 in the core layer improved by 42%.

A third set of experiments were run using three different COC grades as in Table 1 over a wide $T_g$ range. The bulk of the polyethylene used in the films is Exceed™ 1018 LA LLDPE blended with 5 wt % LD 150 BW as a skin layer, and 10 wt % COC blend with Exceed™ 1018 HA LLDPE as the core layer. Co-extruded polyethylene films are prepared on W&H blown line with five extruders according to film design in Table 7, and according to the conditions generally described in Table 3 above. All films had a similar average film thickness of about 50 µm. All films are conditioned more than 48 h after produce.

The film properties of dart, 1% secant flexural modulus, tensile strength, puncture and sealing plots were tested and summarized in Table 8. It was discovered that compared to the control film, there was a 50 to 100% increase of MD modulus, 40% increase of TD modulus, 0 to 40% increase of dart and maintained tensile strength in both MD TD directions in the COC-containing film as summarized in the data of Table 8. Haze became lower by 20-40%. Plateau sealing strength was improved up to 50%. The results show that polyethylene film properties of toughness, stiffness, optical and sealing can be improved through blend with COC.

TABLE 7

Film Design for Third Set of Experiments

| Number | Skin | Sub Skin | Core | Sub Skin | Skin |
|---|---|---|---|---|---|
| 10 | LLDPE 95 wt % LD 5% | | LLDPE 100 wt % | | LLDPE 95 wt % LD 5 wt % |
| 11 | LLDPE 95 wt % LD 5 wt % | | LLDPE 90 wt % COC1 5 wt % | | LLDPE 95 wt % LD 5 wt % |
| 12 | LLDPE 95 wt % LD 5 wt % | | LLDPE 90 wt % COC2 10 wt % | | LLDPE 95 wt % LD 5 wt % |
| 13 | LLDPE 95 wt % LD 5 wt % | | LLDPE 90 wt % COC3 10 wt % | | LLDPE 95 wt % LD 5 wt % |

TABLE 8

Film Properties of Third Set of Experiments

| Film property | 10 | 11 | 12 | 13 |
|---|---|---|---|---|
| 1% secant flexural modulus, MD (MPa) | 197 | 418 | 305 | 294 |
| 1% secant flexural modulus, TD (MPa) | 200 | 277 | 257 | 254 |
| Tensile Strength, MD (MPa) | 53.5 | 53.0 | 52.3 | 54.3 |
| Tensile Strength, TD (MPa) | 55.2 | 59.0 | 54.7 | 57.1 |
| Dart Drop (g/µm) | 15.3 | 14.3 | 20.2 | 21.3 |
| Haze (%) | 9.6 | 5.7 | 7.2 | 7.3 |

A fourth set of experiments were performed in a manner similar to those above but with different film structures. Three different COC grades are used, detailed in Table 1. Multiple layer of polyethylene films are prepared on W&H blown line as described above with five extruders according to film design in Table 2. All films are blown under the same BUR. ExxonMobil polyethylenes Exceed™ 1018 LA LLDPE and LD 150 BW were blended as skin layers, while LD 165 BW was blended with 10% COC for the core layer, co-extruded layer distribution is 1.5:6:1.5, outlined in Table 9. All films have an average thickness of about 50 µm, and are conditioned more than 48 h after being produced.

The shrink properties of each film was tested in both MD and TD directions. A significant increase of TD shrink by 42% with Topas™ 5013F-04 over the control film was observed, with a minor decrease on MD shrink, as outlined in the data of Table 10.

TABLE 9

Film Design for Fourth Set of Experiments

| Number | Skin | Sub Skin | Core | Sub Skin | Skin |
|---|---|---|---|---|---|
| 14 | LLDPE 95 wt % LD 5% | LD 100 wt % | | LLDPE 95 wt % LD 5 wt % | |
| 15 | LLDPE 95 wt % LD 5 wt % | LD 90 wt % COC1 5 wt % | | LLDPE 95 wt % LD 5 wt % | |
| 16 | LLDPE 95 wt % LD 5 wt % | LD 90 wt % COC2 10 wt % | | LLDPE 95 wt % LD 5 wt % | |
| 17 | LLDPE 95 wt % LD 5 wt % | LD 90 wt % COC3 10 wt % | | LLDPE 95 wt % LD 5 wt % | |

TABLE 10

Film Properties of Fourth Set of Experiments

| Film property | 14 | 15 | 16 | 17 |
|---|---|---|---|---|
| Shrinking force, MD (mN) | 124 | 69 | — | — |
| Shrinking force, TD (mN) | 2 | 15 | — | — |
| Contracting Force, MD (mN) | 1079 | 1747 | — | — |
| Contracting Force, TD (mN) | 759 | 1262 | — | — |
| Shrinkage Rate, MD (%) | 83 | 62 | 78 | 75 |
| Shrinkage Rate, TD (%) | 0 | 25 | 15 | 18 |
| Shrinkage Speed at Max MD (s) | 12 | 30 | — | — |
| Shrinkage Speed at Max TD (s) | 36 | 16 | — | — |

A fifth set of experiments was performed using the three different COC grades shown in Table 1. Multiple layers of polyethylene films were prepared on a W&H blown line with three extruders according to the film design in Table 11 in a similar manner as described above. All films are blown under the same BUR. ExxonMobil's Exceed™ 1018 LA LLDPE and 5 wt % LD 150 BW were blended as skin layer, while LD 165 BW blended with 10 wt % COC as core layer. All films have similar gauge of around 50 µm. All the films are conditioned 48 h after processing.

The film properties of 1% secant modulus, tensile strength, dart, puncture, haze and Elmendorf tear were tested. Tear strength was found to decrease in all COC grades, but with improvement or maintenance for other mechanical properties, as shown in Table 12. The results demonstrate the blends of polyethylene with COC is a feasible way to achieve an easy TD tear without diminishing the general film strength.

TABLE 11

Film Design for Fifth Set of Experiments

| Number | Skin | Sub Skin | Core | Sub Skin | Skin |
|---|---|---|---|---|---|
| 18 | LLDPE 95 wt % LD 5% | | LD 100 wt % | | LLDPE 95 wt % LD 5 wt % |
| 19 | LLDPE 95 wt % LD 5 wt % | | LD 90 wt % COC1 5 wt % | | LLDPE 95 wt % LD 5 wt % |
| 20 | LLDPE 95 wt % LD 5 wt % | | LD 90 wt % COC2 10 wt % | | LLDPE 95 wt % LD 5 wt % |
| 21 | LLDPE 95 wt % LD 5 wt % | | LD 90 wt % COC3 10 wt % | | LLDPE 95 wt % LD 5 wt % |

TABLE 12

Film Properties of Fifth Set of Experiments

| Film property | 18 | 19 | 20 | 21 |
|---|---|---|---|---|
| 1% secant flexural modulus, MD (MPa) | 223 | 353 | 355 | 312 |
| 1% secant flexural modulus, TD (MPa) | 262 | 301 | 367 | 319 |
| Tensile Strength, MD (MPa) | 24.8 | 24.3 | 29.5 | 28.3 |
| Tensile Strength, TD (MPa) | 30.0 | 28.1 | 31.8 | 28.7 |
| Dart Drop (g/µm) | 7.4 | 6.9 | 7.5 | 7.1 |
| Puncture Energy at Break (mJ/µm) | 0.126 | 0.099 | 0.109 | 0.130 |
| Elmendorf Tear, MD (g/µm) | 4.6 | 3.4 | 1.6 | 1.7 |
| Elmendorf Tear, TD (g/µm) | 4.2 | 2.5 | 2.6 | 3.1 |
| Haze (%) | 4.3 | 4.5 | 4.6 | 4.5 |

As used herein, "consisting essentially of" means that the claimed article or polymer includes only the named components and no additional components that will alter its measured properties by any more than 20, or 15, or 10%, and most preferably means that "additives" are present to a level of less than 5, or 4, or 3, or 2 wt % by weight of the composition. Such additional additives can include, for example, fillers, nucleators or clarifiers, colorants, antioxidants, alkyl-radical scavengers (preferably vitamin E, or other tocopherols and/or tocotrienols), anti-UV agents, acid scavengers, curatives and cross-linking agents, aliphatic and/or cyclic containing oligomers or polymers (often referred to as hydrocarbon resins), and other additives well known in the art. As it relates to a process, the phrase "consisting essentially of" means that there are no other process features that will alter the claimed properties of the polymer, polymer blend or article produced therefrom by any more than 10, 15 or 20%, but there may otherwise be minor process features not named.

For all jurisdictions in which the doctrine of "incorporation by reference" applies, all of the test methods, patent publications, patents and reference articles are hereby incorporated by reference either in their entirety or for the relevant portion for which they are referenced.

What is claimed is:
1. A multi-layered polyethylene film having:
  a dart drop of at least 7 g/um,
  a 1% TD secant flexural modulus of at least 280 to 460 MPa, a 1% MD secant flexural modulus of at least 280 to 460 MPa, and a TD shrink within a range from 20% to 36%, an MD shrink within a range from 55 to 90%;

said film comprising at least a core layer and at least one other layer adjacent thereto, the core layer comprising within a range from 5 wt % to 50 wt % of a cyclic olefin copolymer based on the weight of the core layer, and within a range from 50 wt % to 95 wt % of a polyethylene based on the weight of the core layer, wherein:

1) the cyclic olefin copolymer has a glass transition temperature ($T_g$) of at least 80° C., 2) the core layer is sandwiched between two polyethylene skin layers, 3) each skin layer independently comprises at least 50 wt % linear low density polyethylene and from 0.5 wt % to 20 wt % low density polyethylene by weight of each skin layer, and 4) the polyethylene of the core layer is: i) a linear low density polyethylene comprising from 0.5 to 20 wt % $C_4$ to $C_{12}$ α-olefin derived units by weight of the copolymer, the remainder of the copolymer comprising ethylene-derived units, ii) a low density polyethylene, or iii) a combination thereof.

2. The multi-layered polyethylene film of claim 1, wherein two or more core layers are present optionally having a layer of polyethylene there between.

3. The multi-layered polyethylene film of claim 2, further comprising a sub-skin layer sandwiched between the core layer and each skin layer.

4. The multi-layered polyethylene film of claim 3, wherein each sub-skin layer independently comprises at least 50 wt % linear low density polyethylene by weight of each skin layer.

5. The multi-layered polyethylene film of claim 1 wherein the core layer comprises from 5 wt % to 20 wt % of the cyclic olefin copolymer based on the weight of the core layer, the remainder of the core being LDPE and/or LLDPE, based on the weight of the core layer, and the cyclic olefin copolymer has a glass transition temperature ($T_g$) of 90 to 160° C.

6. The multi-layered polyethylene film of claim 5, wherein each polyethylene skin layer has a density within a range from 0.88 g/cm³ to 0.925 g/cm³.

7. The multi-layered polyethylene film of claim 5, skin layer further independently comprising within a range from 0.5 wt % to 20 wt/o LDPE.

8. The multi-layered polyethylene film of claim 1, wherein the cyclic olefin copolymer has an I2 (2.16 kg/190° C.) within a range from 0.01 to 1 g/10 min.

9. The multi-layered polyethylene film of claim 1, wherein the cyclic olefin copolymer comprises 60 wt % or more cyclic olefin derived units by weight of the cyclic olefin copolymer.

10. The multi-layered polyethylene film of claim 1, wherein the linear low density polyethylene of the core layer comprises from 0.5 to 10 wt % $C_4$ to $C_{12}$ α-olefin derived units by weight of the copolymer, the remainder of the copolymer comprising ethylene-derived units.

11. The multi-layered polyethylene film of claim 1, wherein the linear low density polyethylene of the core layer has a peak melting point temperature ($T_m$) within a range from 90° C. to 130° C.

12. The multi-layered polyethylene film of claim 1, wherein the linear low density polyethylene of the core layer has an I2 (2.16 kg/190° C.) within a range from 0.2 g/10 min to 5 g/10 min.

13. The multi-layered polyethylene film of claim 1, having a TD shrinking force within a range from 10 to 20 mN.

14. The multi-layered polyethylene film of claim 1, having an MD shrinking force within a range from 60 to 80 mN.

15. The multi-layered polyethylene film of claim 1, having a 1% TD secant flexural modulus of 300 to 460 MPa.

16. The multi-layered polyethylene film of claim 1, having a 1% MD secant flexural modulus of 300 to 460 MPa.

17. The multi-layered polyethylene film of claim 1, having a plateau seal strength of at least 14 N.

18. The multi-layered polyethylene film of claim 1, the core layer further comprising within a range from 0.5 wt % to 20 wt % LDPE.

19. The multi-layered polyethylene film of claim 1, having a thickness within a range from 30 µm to 100 µm.

20. The multi-layered polyethylene film of claim 1, comprising at least the core layer sandwiched between two to six layers comprising LLDPE.

21. A shrink film comprising the multi-layered polyethylene film of claim 1.

22. A process comprising extruding the multi-layered polyethylene film of claim 1 at a melt temperature at the die of 238° C. or less.

23. A process comprising extruding the multi-layered polyethylene film of claim 1 at a melt pressure of 42 MPa or less.

24. The multi-layered polyethylene film of claim 1, wherein the film has a gloss of at least 70%.

25. The multi-layered polyethylene film of claim 1, wherein the film has a haze value of less than 70%.

26. The multi-layered polyethylene film of claim 1, wherein the cyclic olefin copolymer has a glass transition temperature ($T_g$) of 80 to 160° C.

27. The multi-layered polyethylene film of claim 1, wherein the cyclic olefin copolymer has a glass transition temperature ($T_g$) of 90 to 150° C.

28. The multi-layered polyethylene film of claim 1, wherein the cyclic olefin copolymer has a glass transition temperature (T) of 90° C. to 130° C.

29. The multi-layered polyethylene film of claim 1, wherein the cyclic olefin copolymer consists essentially of cyclic olefin copolymer having a glass transition temperature ($T_g$) of at least 90° C.

30. The multi-layered polyethylene film of claim 1, wherein the cyclic olefin copolymer consists essentially of cyclic olefin copolymer having a glass transition temperature ($T_g$) of at least 80° C. and an I2 (2.16 kg/190° C.) from 0.01 to 2 g/10 min.

31. The multi-layered polyethylene film of claim 1, wherein the film has:

i) a TD shrink of at least 18 to 36%;

ii) a TD shrinking force within a range from 10 to 20 mN;

iii) a MD shrink within a range from 55 to 90%;

iv) MD shrinking force within a range from 60 to 80 mN;

v) a 1% TD secant flexural modulus of 300 MPa to 400 MPa;

vi) 1% MD secant flexural modulus of 300 MPa to 400 MPa vii) a plateau seal strength of at least 14 N;

viii) an MD or TD tensile strength of 20 to 65 MPa;

ix) a dart drop of 6 to 40 g/µm;

x) a gloss of at least 70%;

xi) a haze value of less than 15%; and xii) a dart drop from 2 to 20 g/μm.

32. The multi-layered polyethylene film of claim 1, wherein the film is made in a blown film process in which the multiple layers of the film, comprising said core layer and said polyethylene skin layers, are extruded through a die to form a thin-walled tube; the tube is cooled;

and the tube is then passed through nip rolls to form the multi-layered polyethylene film.

* * * * *